United States Patent [19]

Kemper

[11] 4,282,947

[45] Aug. 11, 1981

[54] HYBRID VEHICULAR POWER SYSTEM AND METHOD

[75] Inventor: Yves J. Kemper, Birmingham, Mich.

[73] Assignee: Vadetec Corporation, Troy, Mich.

[21] Appl. No.: 904,776

[22] Filed: May 11, 1978

[51] Int. Cl.³ .............................................. B60K 9/00
[52] U.S. Cl. .................................... 180/165; 74/572; 192/0.033
[58] Field of Search ............... 180/165, 54 R; 74/859, 74/572, 571; 192/0.077, 0.033

[56] References Cited

U.S. PATENT DOCUMENTS

| | | | |
|---|---|---|---|
| 2,196,064 | 3/1940 | Erban | 180/70 R |
| 2,261,019 | 10/1941 | Chilton | 123/179 J |
| 2,803,151 | 8/1957 | Clerk | 74/751 |
| 3,672,244 | 6/1972 | Nasvytis | 74/859 |
| 3,734,222 | 5/1973 | Bardwick | 180/165 |
| 3,771,311 | 11/1973 | Herbst | 180/165 X |
| 3,848,410 | 11/1974 | Kinoshita | 60/347 |
| 3,870,116 | 3/1975 | Seliber | 180/165 |
| 3,882,950 | 5/1975 | Strohlein | 180/165 |
| 3,886,810 | 6/1975 | Sugiyama et al. | 180/165 X |
| 4,126,200 | 11/1978 | Miller et al. | 180/165 |
| 4,131,171 | 12/1978 | Keyes | 74/572 X |

Primary Examiner—John J. Love
Assistant Examiner—Michael Mar
Attorney, Agent, or Firm—Robert F. Ziems

[57] ABSTRACT

A hybrid vehicular power system and method in which an automotive vehicle having a conventional engine, an energy storing flywheel and an I.V. transmission, is propelled by coupling the flywheel for rotation with the input of the I.V. transmission in which, for a given input speed, the output of which may be varied from 0 or near 0 continuously to the input speed. The flywheel and the input of the I.V. transmission are coupled to the engine by an overrunning clutch so that the flywheel and the input will be driven at the same or higher speeds than the engine shaft. During initial operation of the vehicle, the engine is coupled to the input of the I.V. transmission and the output of the transmission coupled to the drive wheels of the vehicle. Engine speed and I.V. transmission speed ratio are varied to accelerate the vehicle from a stop. When the I.V. transmission ratio is adjusted to unity, a second mode of operation is initiated in which the engine drive shaft is connected directly with the drivewheel shaft and also with the output of the I.V. transmission. In this second mode of operation, excess power developed as a result of operating the engine at optimum efficiency is fed back through the I.V. transmission from the output to the input thereof. Continued storage of excess power may occur with flywheel speeds increased by the speed ratio of the I.V. transmission.

20 Claims, 3 Drawing Figures

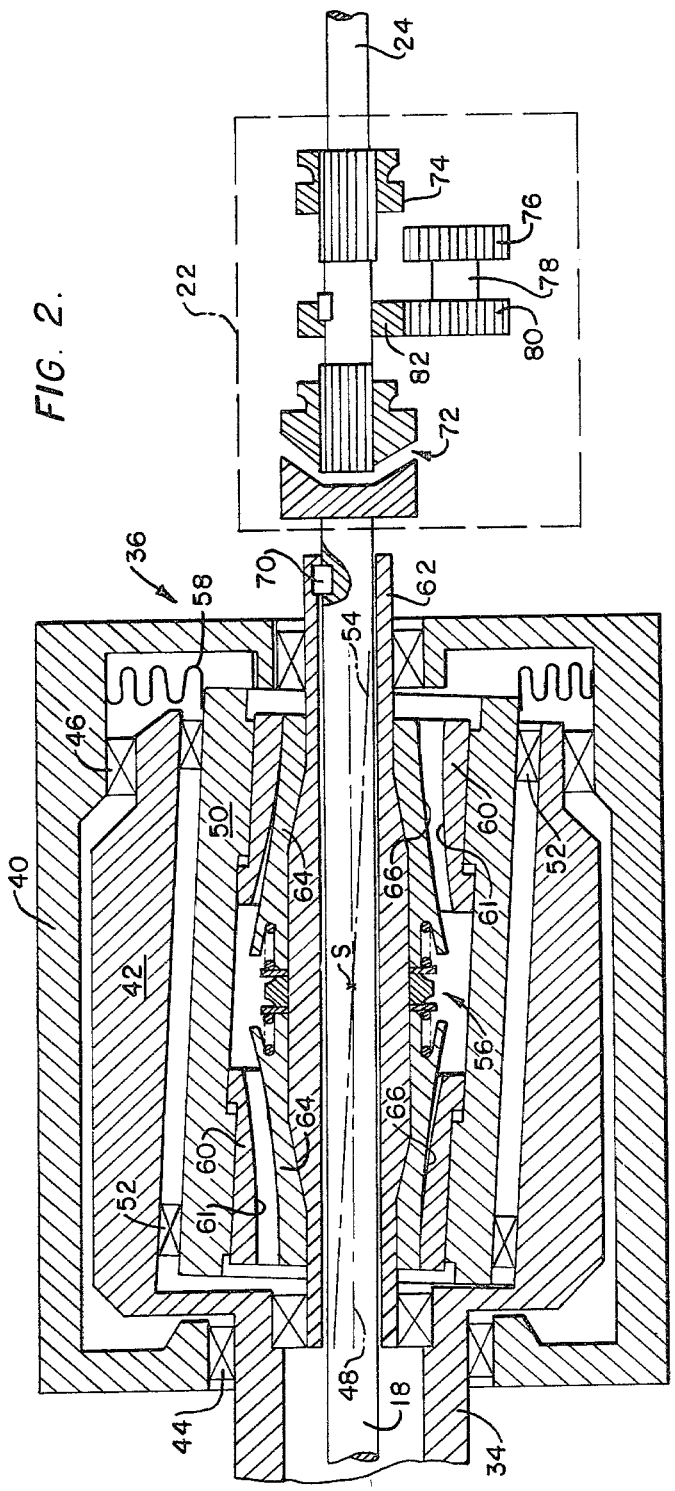

HYBRID VEHICULAR POWER SYSTEM AND METHOD

BACKGROUND OF THE INVENTION

This invention relates to vehicular power methods and systems and more particularly, it concerns hybrid vehicle power methods and systems in which a combination of generated and stored power is used for vehicle propulsion.

Hybrid vehicle power systems which combine a primary power source or engine with an energy storage device, such as a flywheel, are prevalently disclosed in prior publications and issued patents. Although the use of such hybrid power systems in the past has been limited and primarily experimental, recent emphasis on fuel economy and reduced air pollution by automotive engines has justified a renewed interest in this approach to vehicular propulsion. It is well known, for example, that fuel economy can be maximized by achieving maximum operating efficiency of automotive internal combustion engines. While technology exists for optimizing the efficiency of an internal combustion engine, it is difficult if not impossible to increase engine efficiency without also increasing the percentage of air pollutants, particularly nitrogen oxides, discharged with the exhaust gases of the engine. Hybrid power systems offer a potential answer to this dilemma by permitting an engine to be operated at increased efficiency during periods of time when power generated by engine operation is needed and also to store sufficient energy in a flywheel so that the vehicle may be driven during limited periods of times with the engine shut off. In other words, such hybrid power systems provide an answer to fuel economy by increasing engine efficiency and also an answer to reduced air pollution by reducing the duration of engine operation for a given time of vehicle operation.

It is known, for example, that a simple flywheel represented by a carbon steel disk 3 cm. in thickness and between 40 and 46 cm. in diameter, when rotated at speeds of between 6,000 RPM and 8,000 RPM will provide sufficient energy to propel a conventional automotive vehicle for short distances or start an automotive engine after it has been shut off for moderate durations of time such as the time intervals incurred under city driving conditions when a vehicle is stopped due to traffic conditions. These factors, combined with the facility for storing the kinetic energy of vehicle momentum by driving the flywheel during at least initial stages of vehicle braking, make it clear that the energy storing capabilities of such a flywheel could result in substantial fuel savings and reduction of air pollution by automotive engines simply by reducing the total time of engine operation and limiting periods of engine operation where engine efficiency is low.

It is also known, however, that the transfer of kinetic energy to or from the flywheel of a hybrid system requires an infinitely variable or I.V. transmission in order that the rotational speeds of the flywheel may be related to the rotational speeds at which power must be transmitted to or be absorbed from an automotive driveshaft, for example, smoothly and without loss of energy. Heretofore, the I.V. transmission has represented not only a weak link in the power train of hybrid power systems, but also, an additional component in the power train and a source of potential mechanical problems separate from those associated with the flywheel.

The state-of-the-art relating to I.V. transmissions has been developed to a stage where energy transfer to and from a flywheel rotating at moderate speeds can be accomplished efficiently and effectively within the operating parameters of a hybrid vehicular power system. In a commonly owned, co-pending U.S. application Ser. No. 706,291, filed July 19, 1976 by Yves Jean Kemper now U.S. Pat. No. 4,152,946, for example, several embodiments of an I.V. transmission are disclosed in which the inertial forces of moving bodies or components are resolved in a manner to augment the normal force by which rolling traction surfaces on two of three relatively movable bodies may transmit torque with an infinitely variable ratio of output/input speeds. The I.V. transmissions disclosed in this co-pending application, moreover, permit a wide range of speed ratios and are capable of power transmission at high efficiencies.

SUMMARY OF THE INVENTION

In accordance with the present invention, an automotive vehicle having a conventional engine, an energy storing flywheel and an I.V. transmission, is propelled by coupling the flywheel for rotation directly at the input speed of the I.V. transmission, the output of which may vary continually at speeds from at least four times slower than the input to a 1:1 ratio with the input. During initial operation, the engine is coupled with the input of the I.V. transmission so that the flywheel and the I.V. transmission input will be driven at engine speed. The output of the I.V. transmission, connected at all times at least during forward movement of the vehicle with the vehicle drivewheels, is increased by either adjusting the ratio of the I.V. transmission, increasing the speed of the engine, or both. When the ratio of the I.V. transmission is unity (I.V. output equals I.V. input), the engine is coupled directly with the drivewheel shaft and the output of the I.V. transmission. Thereafter, the I.V. transmission is again adjusted so the output thereof drives the input and the flywheel at speeds which are a multiple of engine speed depending on the ratio to which the I.V. transmission is adjusted. An overrunning clutch coupling the engine to the input of the I.V. transmission permits this operation. In the ensuing operation of the vehicle, the engine may be shut off whenever the load demand of vehicle propulsion may be satisfied by the energy stored in the flywheel. The energy of vehicle momentum during deceleration is fed back to the flywheel through the I.V. transmission. When the energy stored in the flywheel is dissipated to an amount represented by a predetermined rotational velocity of the flywheel, the output of the I.V. transmission and the drivewheel shaft are connected to the engine output shaft to restart the engine.

A principal object of the present invention is, therefore, the provision of an improved method of propelling automotive vehicles. Other objects of the invention include: the provision of such a method which enables the use of known technology relative to flywheels and I.V. transmissions in a hybrid power system capable of optimizing engine efficiency; the provision of such a method which minimizes the inertial load on an automotive engine during low speed vehicle acceleration; the provision of such a method in which power generated by an automotive engine in excess of that needed to propel the vehicle is diverted to storage during periods of vehicle operation most suited to energy storage; the provision of such a method which facilitates the storage of energy resulting from vehicular momentum during the vehicle deceleration; the provision of such a method which enables the duration of engine operation to be minimized; and the provision of hybrid power system for the practice of such methods.

Other objects and further scope of applicability of the present invention will become apparent from the detailed description following taken in conjunction with the accompanying drawings in which like parts are designated by like reference numerals.

BRIEF DESCRIPTION OF THE DRAWINGS

FIG. 2 is a longitudinal cross-section of an I.V. transmission and gearing incorporated in an exemplary embodiment of the hybrid system of the invention; and FIG. 3 is a diagram depicting relative speeds of the flywheel and drivewheel shaft of the hybrid system of the present invention.

DETAILED DESCRIPTION OF THE PREFERRED EMBODIMENTS

Figure 1:
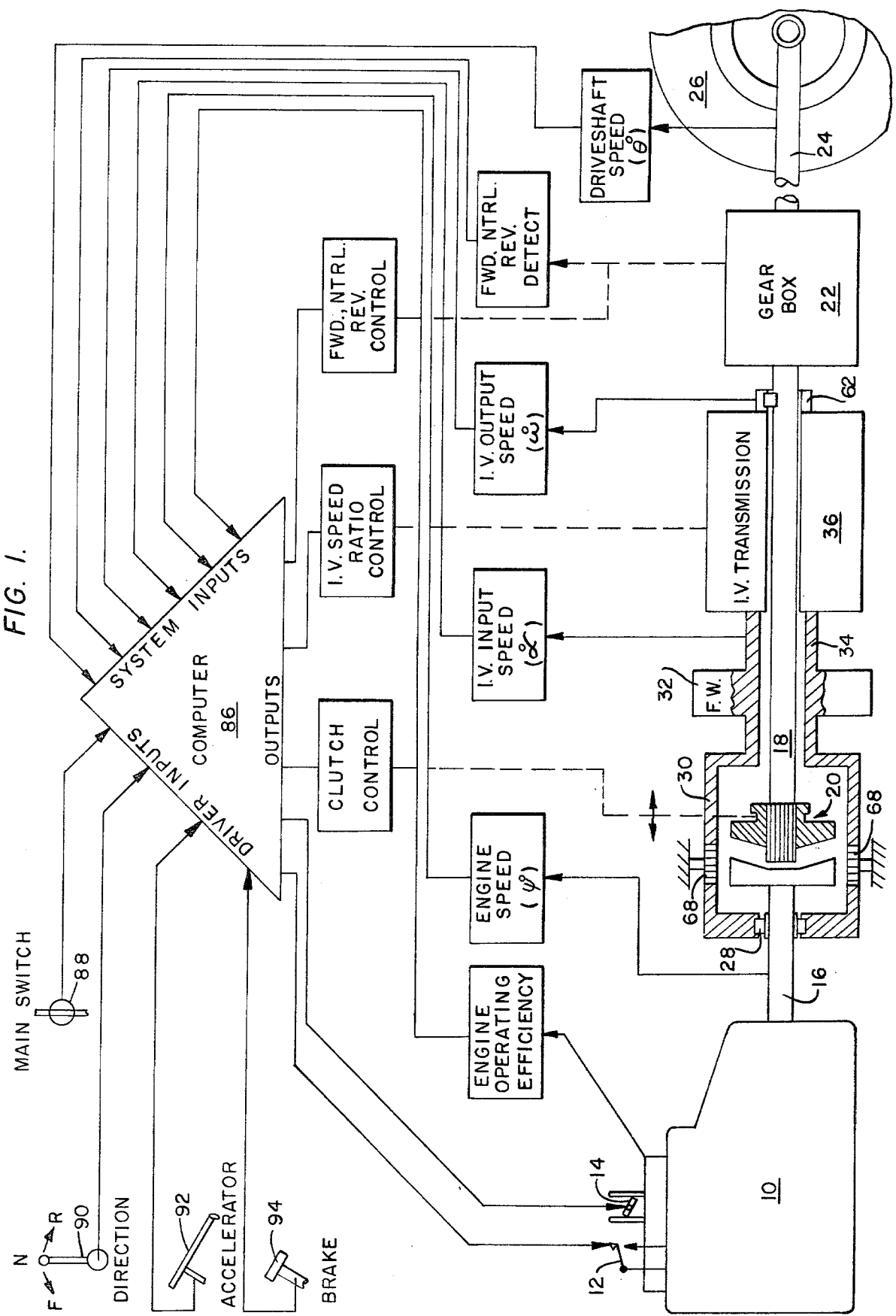
FIG. 1 is a schematic view illustrating various mechanical components of the hybrid power system of the present invention in relation to various sensing and control functions represented in block diagram form.

In FIG. 1 of the drawings, an exemplary embodiment of a hybrid power system by which the present invention is practised, is shown to include a primary power generating unit such as an internal combustion engine 10 having a conventional ignition switch 12, a throttle 14 and a power output shaft 16. The power shaft is adapted to be releasably coupled in direct driving relationship with a shaft 18 by a clutch 20. The clutch 20 may be any of several well-known automotive clutch designs and as such, needs no further elaboration except to note that it is capable of direct torque transfer between the power shaft 16 and the shaft 18 when engaged.

The shaft 18 extends to and constitutes the input of a gearing unit 22 having as an output a final drivewheel shaft 24 coupled directly by a conventional differential gearing (not shown) to the driving wheels 26 of a vehicle to be propelled using the power system of the invention. It will be seen that when the clutch 20 is engaged, torque may be transmitted directly between the power shaft 16 and the drive wheels 26 through the gearing unit 22.

In advance of the clutch 20 in the context of the direction of power transmission from the engine 10, the power shaft 16 is coupled by an overrunning clutch 28 to a torque tube 30 in a manner such that the torque tube will be rotatably driven at rotational speeds at least as great as the speed of the power shaft 16. Since the characteristics of the overrunning clutch 28 will not allow torque to be transmitted in a reverse direction or from the torque tube back to the power shaft 16, the overrunning clutch will not prevent rotation of the torque tube 30 at speeds in excess of power shaft rotational speeds.

The torque tube 30 carries a flywheel 32 in the illustrated embodiment of FIG. 1 and extends to or is keyed with the input 34 of an I.V. transmission generally designated by the reference numeral 36.

The particular construction of the I.V. transmission 36 as well as that of the gearbox 22 may vary widely without departure from the present invention for reasons which will be apparent from the ensuing description. The principal function served by the gearbox 22 is to enable the wheel driveshaft 24 to be reversed relative to the engine shaft 16, the shaft 18 and the I.V. output to be described. Such reversal is of course necessary to enable the vehicle incorporating the system to be operated in a reverse mode. Since it is well within the state-of-the-art relating to I.V. transmissions to achieve an infinite range of speed ratios; that is, an output speed variation for a given input speed of from 0 to unity with the input speed, it is possible for the gearbox to include only a simple reversing gear by which the direction of rotation in the wheel driveshaft 24 may be reversed. It is further possible that the input and output of the I.V. transmission be coupled with the shaft 24 through epicyclic gearing to provide what is well known in the art as an arrangement providing split torque with feedback and by which, the range of speed ratios available in the combination is capable not only of expanding the forward range of speed ratios of the I.V. transmission,, but also so that for a given rotatial velocity of the I.V. input 34, the shaft 24 may be driven through a neutral condition to a rotational direction the reverse of the input 34.

The I.V. transmission 36 together with the torque path from the I.V transmission through the gearbox 22 may be arranged as illustrated in FIG. 2 of the drawings as an illustrative mode of practising the method and system of the present invention. The particular I.V. transmission 36 shown in FIG. 2 is of a type disclosed in the aforementioned co-pending U.S. application Ser. No. 706,291 and the complete disclosure of that application is incorporated herein by reference to the extent that it is necessary to enable one to practice the present invention. The structure and operation of the I.V. transmission 36 therefore, will be summarized herein only briefly to facilitate an understanding primarily of the manner in which the I.V. transmission components operate in the hybrid power plant of the present invention.

As shown in FIG. 2 of the drawings, the I.V. transmission 36 includes a frame 40, a rotatable cranking body 42 journalled by bearings 44 and 46 from the frame for rotation about a first axis 48; a nutatable body 50 supported from the cranking body 42 by bearings 52 concentric with a second axis 54 inclined with respect to and intersecting the first axis 48 at a point S of axes intersection; and a central body 56. The nutatable body is held against rotation about the second axis 54 by an annular diaphragm 58 connected between the nutatable body 50 and the frame 40 at one end thereof and in a manner such that nutation of the body 50, in which the axis 54 thereof travels in a biconical path about the axis 48, is not restrained. The nutatable body carries a pair of axially adjustable rings 60 defining interior traction surfaces 61 of revolution about the second axis 54. The central body 56 includes a hollow shaft 62 on which a pair of cone-like members 64 are splined or otherwise rotatably coupled to be axially movable toward and away from the point S. The cone-like members provide exterior traction surfaces 66 of revolution about the first axis 48 and are biased outwardly so that the traction surfaces 61 and 66 are forceably engaged at two diametrically opposite points of contact spaced equally from the point S. A control mechanism (not shown) adjusts the axial positioning of the rings 60 to vary the ratio of the radius of the traction surfaces 61 to the radius of the traction surfaces 66 at the two points of traction surface engagement.

It will be noted that the input 34 of the I.V. transmission 36 of the disclosed embodiment is coupled directly to the rotatably cranking body 42. The relationship of input rotation and thus, also of cranking body rotation to an output at the central body 56, or more specifically, the hollow shaft 62, is best expressed both in terms of speed relationships and directions of rotation by the equation; $\dot{\omega} = \dot{\alpha}(1-\rho)$. In this equation, $\dot{\alpha}$ is the speed at which the cranking body 42 is rotated, $\dot{\omega}$ is the speed at which the hollow shaft 62 is driven; and $\rho$ is the aforementioned ratio of the radii of the traction surfaces 61 to the radii of the traction surfaces 66. Equally important, when the direction of power transmitted through the transmission is reversed to provide an input speed $\dot{\omega}$, the output speed $\dot{\alpha}$ will vary with the function $\dot{\omega}/(1-\rho)$.

Because the traction surfaces 66 lie within the surfaces 61, the numerical value of $\rho$ will always be in excess of 1 and will range from a minimum of at least 1 to a numerical value of approximately 2 in a practical transmission embodiment. Thus it will be observed from the aforementioned equation that actual values of $\dot{\omega}$ and $\dot{\alpha}$ will be of algebraically opposite signs. In other words, the rotational direction of the central body 56 and thus of the output shaft 62 will be opposite to the direction of rotation at the transmission input 34. Because of this characteristic of the particular I.V. transmission incorporated in the disclosed embodiment, reversing pinion gears 68 are provided in the torque tube 30 in a manner such that when driven by the engine shaft 16 through the overrunning clutch 28, the flywheel 32 and the input 34 to the I.V. transmission will be at the same rotational velocity of the engine shaft 16 but in an opposite direction. The reversing pinions 68 would not be needed in an I.V. transmission where input and output rotation are in the same direction nor would they be needed in an I.V. transmission of the type illustrated in which the rotational components $\dot{\alpha}$ and $\dot{\omega}$ are combined in an epicyclic gearing unit having an output which is reversible through neutral depending on the relative values of the speeds $\dot{\alpha}$ and $\dot{\omega}$.

With reference again to FIG. 2 of the drawing, it will be noted that the output shaft 62 of the I.V. transmission 36 is permanently coupled to the shaft 18 by appropriate means such as a key 70 and further that the shaft 18 may be releasably coupled to direct driving engagement with the wheel driveshaft 24 by a clutch 72 provided as a component of the gearing unit 22. In addition to the clutch 72, the gearing unit includes a reversing gear 74 coupled rotatably with the shaft 24 and splined for axial movement thereon from an idle position shown to a position of engagement with a gear 76 on a counter shaft 78. The counter shaft 78 is rotated continuously by a second gear 80 carried thereon in meshing engagement with a gear 82 keyed to the shaft 24. This organization of gearing is conventional but in conjunction with the clutch 72, may be operated to couple the wheel drive shaft 24 directly with the shaft 18 as mentioned to provide a "forward" drive; the clutch disengaged to effect a "neutral" driving condition; or the reversing gear 74 may be advanced into meshing engagement with the gear 76 followed by re-engagement of the clutch 72 to effect a "reverse" mode of torque transmission to the drivewheels 26.

An incident of the present invention, particularly when using the form of I.V. transmission illustrated in FIG. 2 is that the kinetic energy storing capacity of the cranking body 42 alone, when driven at speeds on the order of 4,000 to 8,000 RPM, is adequate to be used in lieu of a separate flywheel such as the flywheel 32 illustrated in FIG. 1 of the drawings. Other components carried by or coupled with the cranking body 42, such as the nutatable body 50 and the torque tube 30 may contribute to the energy storing capacity of the transmission 36. It will be noted further that in the geometry of the disclosed I.V. transmission, the body 42 represents a structure to which the inertial mass may be added as desired. Moreover, the "flywheel" thus constituted by the cranking body 42, in being supported between bearings 44 and 46 which are well-spaced axially, enables precessional forces which may be developed on changing the orientation of the rotational axis 48, to be absorbed or otherwise accommodated by the bearings 44 and 46.

Operation of the hybrid power plant of the present invention to provide a combination of generated and stored power capable of propelling a vehicle will require a control system by which the several operating characteristics of power train components are monitored in conjunction with manually operated controls to provide control signals for directing the conditions of the several adjustable units described. In FIG. 1, therefore, such a control system is illustrated in block diagram form to include an electronic computer 86 for processing driver and system inputs to develop appropriate control signal outputs. Specifically, driver inputs include a power switch 88, a direction control 90, an accelerator 92 and a brake pedal 94. System functions which are monitored include engine operating parameters such as intake manifold pressure, exhaust gas temperature, exhaust gas composition and the like; engine speed $\dot{\psi}$, I.V. transmission input speed $\dot{\alpha}$, I.V. transmission output speed $\dot{\omega}$, drive shaft speed $\dot{\theta}$, and the condition to which the gearing 22 has been adjusted, namely, forward, neutral or reverse. Adjustable parameters to be controlled by the computer 86 include the ignition switch 12, the engine throttle 14, the clutch 20, the I.V. transmission speed ratio, the clutch 72, and the gearing unit 22. Although the details of the control system are not shown beyond the block diagram representation of FIG. 1 such computerized systems are well known and within the skill of one familiar with computer logic circuitry, given the desired operational characteristics to be accomplished.

In the ensuing description of operation during use of the hybrid power system embodiment exemplified in FIGS. 1 and 2 of the drawings, it is assumed that the engine 10 is a standard automotive engine capable of efficient operation at speeds up to 4,000 RPM and which delivers power at speeds as low as approximately 800 RPM. Also it is assumed that the function $\rho$ in the I.V. transmission ma be adjusted from a minimum value of 1.24 to a maximum of 1.96 thus to provide an input-/output speed ratio range of 4:1. The engine is started using a conventional electric starter to achieve idling operation at 600 RPM. Both clutches 20 and 72 will be disengaged at this time. Because of the connection of the torque tube with the engine output shaft 16 through the overrunning clutch 28, the flywheel 32 or its equivalent in the cranking body 42 will be rotated to 800 RPM, for initial vehicle propulsion, a speed which is inconsequential from the standpoint of energy storage inasmuch as the energy stored is proportional to the square of the rotational speed of the flywheel and/or the cranking body 42. The I.V. transmission at this time is adjusted so that the function $\rho$ will be at its minimum value or 1.24 to provide an I.V. output speed ($\dot{\omega}$) and rotation of the shaft 18 approximating 192 RPM. When the direction lever 90 is shifted to the forward position, the clutch 72 will be engaged to couple the drivewheel shaft 24 directly with the shaft 18 which at this time is driven by the output of the I.V. transmission. As the accelerator pedal 92 is depressed, the I.V. transmission 36 and the engine 10 are simultaneously adjusted by the computer 86 for optimum operation of the engine to develop an I.V. output and correspondingly a wheel drive shaft speed $\overset{\circ}{\theta}$ correlated to the rate at which the accelerator pedal is depressed. This operation may be characterized as an operational Mode I in which the clutch 20 is disengaged and the speed of the wheel driveshaft 24 is controlled solely by operation of the engine and the I.V. transmission. In Mode I, the speed $\overset{\circ}{\alpha}$ of the flywheel and of the I.V. transmission cranking body 42 will be equal to the speed $\overset{\circ}{\psi}$ at which the engine shaft 16 is driven. Thus, in Mode I operation, power developed by the engine is relied on primarily for initial low speed operation and initial acceleration of the vehicle.

When the I.V. transmission has been adjusted so that the output speed $\overset{\circ}{\omega}$ thereof is equal to the speed $\overset{\circ}{\alpha}$ at which the flywheel 32 and cranking body 42 are rotated by the engine shaft 16 through the torque tube 30, the clutch 20 is engaged to effect a direct torque coupling of the engine shaft 16 with the wheel driveshaft 24 by way of the shaft 18 and clutch 72 which has remained in its engaged position. In this operational mode, termed Mode II, power needed to drive the vehicle is again initially supplied by the engine 10 operated at optimum efficiency under the control of the computer 86 to which engine operating parameters are fed. To the extent that optimum engine operation develops power in excess of that needed to propel the vehicle under conditions dictated by operation of the accelerator pedal 92, such excess power is fed back to the flywheel 32 or its equivalent by adjusting the ratio of I.V. transmission 36. In particular, it is noted that the I.V. transmission attains an approximate 1:1 speed ratio when the function $\rho$ is at its maximum value of 1.96. Since the cranking body 42 in Mode II is being driven by the I.V. transmission output 62, decreasing the value of the function $\rho$ will effect a speed-up ratio in the cranking body 42 and in the flywheel 32 (i.e. $\overset{\circ}{\alpha} = \overset{\circ}{\omega}/(1-\rho)$).

Excess power delivered by the engine 10 will be fed back through the I.V. transmission 36 in this manner until flywheel rotational velocities are well into a range of between 4,000 and 8,000 RPM. If the speed ratio range of the I.V. transmission is 4:1, it will be appreciated that a flywheel speed of 8,000 RPM may be achieved by adjusting the I.V. transmission when engine speed reaches 2,000 RPM.

Continued operation of the vehicle in Mode II at relatively constant speed may now be effected by decoupling the clutch 20, turning off the engine 10 and adjusting the I.V. transmission 34 to transmit power from the flywheel to the shaft 18. Also while operating in this way, the energy of vehicular momentum during deceleration may be stored in the flywheel, again by adjusting the ratio of the I.V. transmission. When flywheel speed reaches a predetermined minimum, meaning that the kinetic energy stored therein and available for vehicle propulsion has been dissipated, the ignition switch 12 is again turned on and the clutch 20 engaged to restart the engine using the residual stored energy in the flywheel. Operation may then continue in Mode II.

Operation of this system in the described modes of operation may be appreciated further by reference to FIG. 3 of the drawings in which the relative speeds $\overset{\circ}{\theta}$ and $\overset{\circ}{\alpha}$ (the drivewheel shaft 24 and the flywheel 32 respectively) are represented by upper and lower horizontal lines. The dash lines intersect the respective $\overset{\circ}{\theta}$ and $\overset{\circ}{\alpha}$ line at varying slopes depending on the value of the function $\rho$ or the speed ratio of the I.V. transmission. Thus in Mode I with the engine shaft 16 and the flywheel rotating at 800 RPM, the speed $\overset{\circ}{\theta}$ of the drivewheel shaft may be increased from near 0 up to approximately 800 RPM. Thereafter engine speed may be increased without adjustment of the I.V. transmission and both speeds $\overset{\circ}{\alpha}$ and $\overset{\circ}{\theta}$ will increase accordingly. The dash lines representing various values of $\rho$ to the left of FIG. 3 depict operation in Mode II. Because of the 4:1 range of speed ratios available in the I.V. transmission, maximum flywheel speed may be attained at engine speeds of 2,000 RPM. Correspondingly any combination of flywheel speeds ($\overset{\circ}{\alpha}$) and engine speeds ($\overset{\circ}{\theta}$) in Mode II operation may be achieved by adjusting the speed ratio ($\rho$) of the I.V. transmission.

Once operation in Mode II has been attained and flywheel speeds increased to energy storage velocities, the described Mode I may be re-initiated at any time simply by disengaging the clutch 20 and adjusting the ratio of the I.V. transmission. The engine may be turned off and restarted simply by a momentary engagement of the clutch 20 in the Mode I operation. When the engine is shut off, accessories normally powered by the engine may be driven by a power train (not shown) coupled to the flywheel 32.

To prevent overspeeding of the flywheel 32, the clutch 20 may be engaged with the ignition switch 12 of the engine turned off and the ratio of the I.V. transmission 36 adjusted as needed. This operation is analogous to downshifting in conventional automotive vehicles as an incident to long, downhill travel.

As an alternative to shutting off the engine 10 in Mode II operation, the system of this invention may be operated in a highly effective manner by closing off the fuel supply, turning off the ignition switch 12 and leaving the clutch 20 engaged to crank the engine 10 using energy stored in the flywheel 32. The losses of so cranking the engine may be reduced further by closing the valves (not shown) of the engine in accordance with the disclosure of an article entitled "Valve Selector Hardware" SEA Technical Paper 78 0146 dated March 3, 1978. In this way, no pumping work is done by the engine 10. The slight use of energy to crank the engine in this manner is more than offset by the advantage of using the stored energy in the flywheel 32 to run accessories such as power steering, power brakes, air conditioning and the like, which are normally powered by the engine. In addition, the oil pump of the engine will continue to operate in a manner to assure continuous lubrication of bearings and other such lubricated components without use of fuel. This alternative mode of operation would be particularly effective where under city driving conditions, fuel supply to the engine is cut off during brief interruptions in vehicle movement such as at traffic lights.

Thus, it will be appreciated that by the present invention, an effective vehicle propulsion method and system is provided by which the above-mentioned objectives are completely fulfilled. As pointed out herein, and for other reasons which will become apparent to those skilled in the art from the foregoing description, modifications and/or changes may be made in the disclosed embodiment without departing from the inventive concepts manifested by such embodiments. It is expressly intended therefore that the foregoing description is illustrative only, not limiting, and that the true spirit and scope of the present invention be determined by reference to the appended claims.

I claim:

1. The method of propelling a vehicle having an engine, an energy storing flywheel, a drivewheel and an I.V. transmission having a range of input/output speed ratios variable from a minimum in which output speed is reduced relative to input speed to a maximum, said method comprising the steps of:

coupling the engine to the flywheel and the input of the I.V. transmission to drive the I.V. transmission input at engine speeds;

coupling the output of the I.V. transmission to the drivewheel and varying the speed ratio of the I.V. transmission from minimum to maximum to effect a first operational mode;

coupling the engine to the drivewheel and to the output of the I.V. transmission to initiate a second mode of operation; and adjusting the speed ratio of the I.V. transmission in said second mode of operation to feed back excess power developed by the engine from the output of the I.V. transmission to the input thereof to drive the input and the flywheel at speeds to store the energy of said excess power.

2. The method recited in claim 1 comprising the step of decoupling the engine from the drivewheel and transmitting stored energy from the flywheel to the input and through the output of the I.V. transmission to the drivewheel.

3. The method recited in claim 2 comprising the step of shutting off the engine during energy transmission from the flywheel until speed thereof reaches a predetermined minimum, and coupling the output of the I.V. transmission to the engine for restarting same using the residual energy stored in the flywheel at said predetermined minimum speed.

4. The method recited in claim 1 wherein engine speed and the speed ratio of the I.V. transmission are simultaneously adjusted in said first mode of operation to achieve optimum engine efficiency for the conditions of vehicle propulsion in said first mode.

5. The method recited in claim 1 comprising the steps of alternating the coupling of the engine and the output of the I.V. transmission with the drivewheel in said second mode of operation.

6. The method recited in claim 1 comprising the step of varying the ratio of the I.V. transmission from maximum to minimum during deceleration of the vehicle to store the energy of vehicular momentum.

7. The method recited in claim 6 comprising the step of limiting the maximum speed of the flywheel by coupling the output of the I.V. transmission to the engine and then shutting off the engine.

8. The method recited in claim 7 comprising the step of adjusting the I.V. speed ratio to its maximum value prior to coupling the output of the transmission to the engine and then adjusting the I.V. transmission towards its minimum value.

9. The method recited in claim 1 wherein the engine is an internal combustion engine having a fuel supply and intake/exhaust valves, said method comprising the steps of:

blocking the supply of fuel to the engine; and transmitting stored energy from the flywheel to the engine, thereby to crank the engine without use of fuel.

10. The method recited in claim 9 including the step of disabling the engine intake/exhaust valves to prevent the engine from performing pumping work when being cranked by the energy stored in the flywheel.

11. The method recited in claim 10 wherein the vehicle includes power accessories normally driven by the engine and including the step of driving the power accessories during engine cranking by energy stored in the flywheel.

12. A hybrid power system for a vehicle having drive wheels, said power system comprising:

a power generating means having a power output;

a reversible I.V. transmission including first and second input/output means and means to transmit power from said first to said second input/output means to drive said second input/output means at varying speeds equal to or less than the speed of said first input/output means and to transmit power from said second to said first input/output means to drive said first input/output means at varying speeds in excess of said second input/output means;

energy storage means connected to said first input/output means to store kinetic energy in amounts proportional to the speed of said first input/output means;

means connecting said power output and said first input means to drive said first input/output means in one direction of power transmission and to prevent power transmission from said first input/output means to said power output;

means connecting said second input/output means for direct transmission of power to the drivewheels of the vehicle; and means for coupling said power output to the drivewheels and said second input/output means to establish a direct transmission of power from said power output to the drivewheels and to transmit power to said energy storage means from said second input/output means through said first input/output means to store power generated by said power generated means in excess of that required to drive the drivewheels.

13. The apparatus recited in claim 11 wherein said first and second input/output means comprise first and second rotatable bodies, respectively.

14. The apparatus recited in claim 13 wherein said first rotatably body comprises said energy storage means.

15. The apparatus recited in claim 13 wherein said energy storage means comprises a flywheel coupled for rotation with said first rotatable body.

16. The apparatus recited in claim 15 wherein said flywheel is coupled for rotation at the same speed as said first rotatable body.

17. A hybrid power system for a vehicle having drive wheels, said power system comprising:

a power generating means having a power shaft;

an I.V. transmission having a rotatable input body, a rotatable output body, and means to transmit torque from said input body to said output body to rotate said output body at varying speeds equal to or less than the speed of said input body and to transmit torque from said output body to said input body to rotate said input body at varying speeds in excess of said output body;

a flywheel coupled for rotation with said input body;

means for transmitting torque from said power shaft to said input body and to prevent transmission of torque from said input body to said power shaft;

a drivewheel shaft coupled to said output body; and means for releasably coupling said power shaft to said drivewheel shaft and said output body to establish a direct transmission of torque from said power shaft to said drivewheel shaft and to drive said flywheel by torque transmitted in a reverse direction from said output body to said input body at speeds excess of the speeds of said power shaft and said drivewheel shaft.

18. The apparatus recited in claim 17 wherein said means for transmitting torque from said power shaft to said input body comprises an overrunnning clutch.

19. The apparatus recited in claim 18 wherein said overrunning clutch is located ahead of said means for releasably coupling said power shaft in the context of power transmission from said power generating means.

20. The method of propelling a vehicle having power generating means, a drivewheel, energy storage means and a reversible I.V. transmission, said method comprising the steps of:

transmitting power from the power generating means through the I.V. transmission in one direction to the drivewheel to propel the vehicle at speeds determined by adjustment of the I.V. transmission to effect to a first mode of operation and in a second mode of operation, transmitting power from the power generating means directly to the drive wheels while simultaneously diverting power in excess of that needed for vehicle propulsion through the I.V. transmission in a reverse direction to the energy storage means.

* * * * *